W. L. HAYMOND.
LAWN MOWER.
APPLICATION FILED SEPT. 7, 1915.
1,247,832.
Patented Nov. 27, 1917.
2 SHEETS—SHEET 1.
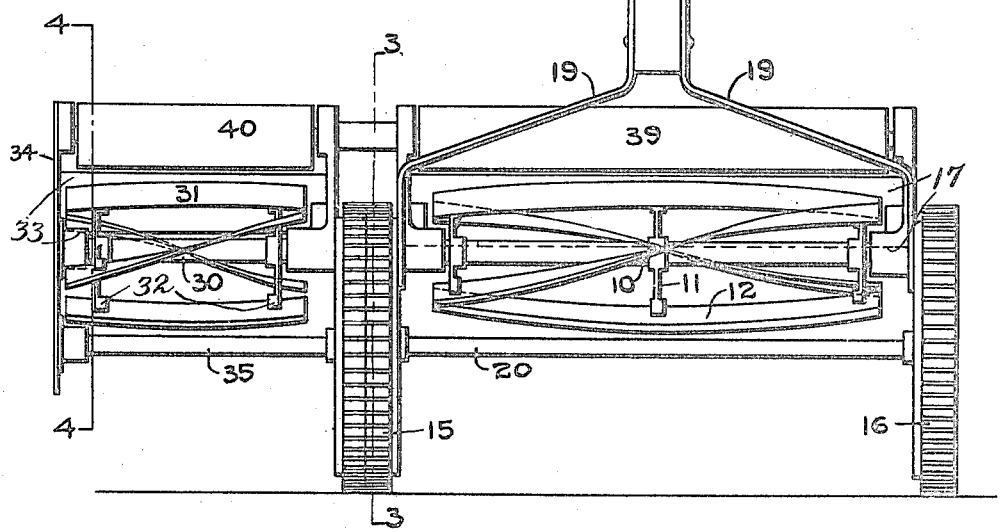
INVENTOR:—
WIRT L. HAYMOND.
BY James L. Hopkins,
ATTORNEY.

W. L. HAYMOND.
LAWN MOWER.
APPLICATION FILED SEPT. 7, 1915.

1,247,832.

Patented Nov. 27, 1917.
2 SHEETS—SHEET 2.

INVENTOR:—
WIRT L. HAYMOND
BY James L. Hopkins,
ATTORNEY.

UNITED STATES PATENT OFFICE.

WIRT L. HAYMOND, OF WEBSTER GROVES, MISSOURI, ASSIGNOR OF ONE-HALF TO HERMAN A. MORSMAN, OF ST. LOUIS, MISSOURI.

LAWN-MOWER.

1,247,832.   Specification of Letters Patent.   Patented Nov. 27, 1917.

Application filed September 7, 1915. Serial No. 49,286.

*To all whom it may concern:*

Be it known that WIRT L. HAYMOND, a citizen of the United States, residing at Webster Groves, St. Louis county, State of Missouri, has invented certain new and useful Improvements in Lawn-Mowers, of which the following is a specification, reference being had therein to the accompanying drawing.

My invention relates to improvements in lawn mowers, and has for its object to provide a lawn mower which, in addition to the usual or primary cutting mechanism mounted and operated between the driving wheels, is provided with an auxiliary cutting mechanism mounted outside one or both of the driving wheels, in alinement with the said primary mechanism, to the end of cutting the edge of a lawn. The said auxiliary mechanism is carried by a frame which permits it to operate beneath the branches of bushes, hedges or other shrubbery where the main body of the mower has not sufficient room to operate without injury to such shrubbery. Furthermore, the construction of said auxiliary cutter permits it to be used in cutting the portion of the lawn which abuts on walks, walls or buildings.

In the drawings—

Figure 1 is an elevation of a machine embodying my invention.

Fig. 2 is a transverse sectional view of the wheel 15 and its contained mechanism.

Figure 3:
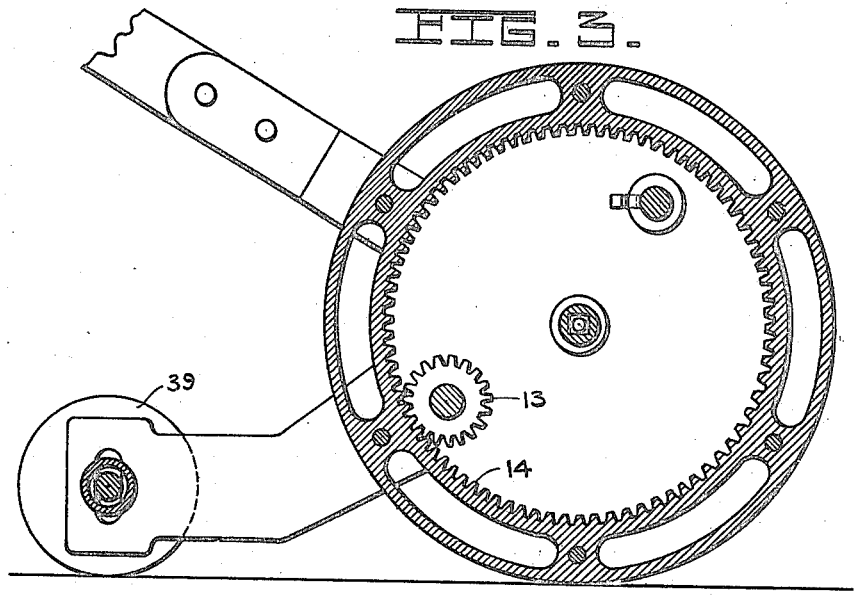
Fig. 3 is a vertical view in section taken on the line 3—3 of Fig. 1.
Figure 4:
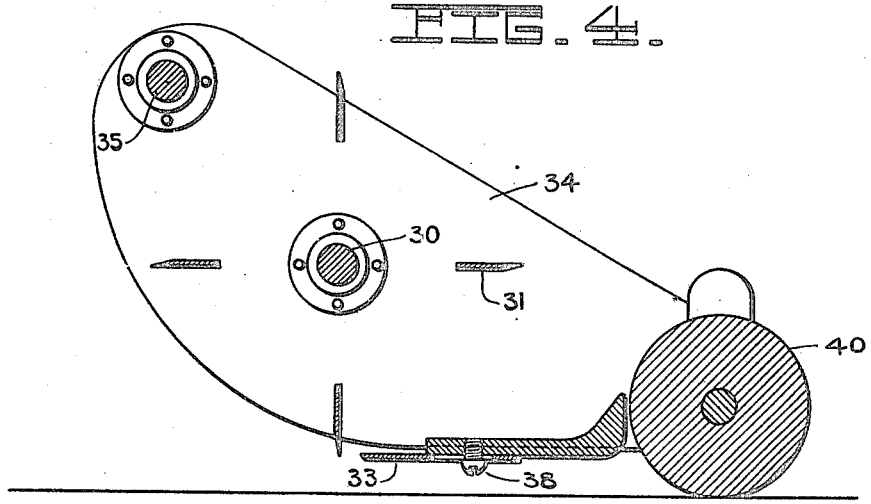
Fig. 4 is a similar sectional view taken on the line 4—4 of Fig. 1.

As shown in the drawings, the main driving shaft or blade shaft 10 carries the cutter heads 11 upon which two or more spirally arranged cutting blades 12 are mounted. The shaft 10 is geared with cogwheels 13 to the internal gear 14 with which the wheels 15 and 16 are provided. The construction thus far described is old and well-known in the art.

The wheels 15 and 16 in said construction are outside the swath cut by the blades 12 as they revolve with a shearing cut against the horizontal blade 17. Therefore the wheel 15 or the wheel 16 will prevent the cutting of grass along the margin of a lawn which abuts against a wall or other obstruction. The machine being pushed by the handle-bar 18, terminating in the yoke 19, which yoke 19 is normally above the plane of the cutting mechanism, it is impossible to cut grass grown beneath shrubbery without injury to the lower branches of such shrubbery.

To overcome the defects in operation thus described I have provided an auxiliary cutting mechanism comprising the blade-shaft or auxiliary driving-shaft 30, carrying the spirally arranged cutting blades 31 by means of cutter-heads 32, which blades 31 coöperate with the horizontal blade 33. The end-plate 34 carries said shaft 30 and is secured to the brace-rod 20 by the brace-rod 35, which rods are detachably secured together by the coupler 36. Similarly the shafts 10 and 30 are detachably secured to each other by the coupler 37. The horizontal blade 33 is made adjustable by means of the screw 38. As ground bearings, the rollers 39 and 40 are provided.

The wheel 15 is composed of the separable halves 41 and 42, separably connected by the bolts 43.

While I have shown and described a lawn mower in which but one attachment embodying my invention is described, it may be desirable to employ two of said attachments in one machine. Where but one of the attachments is used it may be mounted on either side of the machine as desired. The device of my invention may be built integrally with the main or primary mowing mechanism, and other modifications of the machine shown and described may be made without departing from my invention as it is above disclosed and hereinafter claimed.

Having thus described my invention, what I claim as new and desire to have secured to me by the grant of Letters Patent, is—

1. In a lawn mower having wheels, a main brace-rod extending between said wheels, a main driving shaft and a primary cutting mechanism driven by said shaft, an auxiliary cutting mechanism mounted outside said primary driving mechanism and in alinement therewith and having an auxiliary driving-shaft detachably coupled to and driven by said main driving shaft, an end plate having a bearing for the auxiliary driving-shaft, and an auxiliary brace-rod secured to said plate and detachably coupled to said main brace-rod.

2. In a lawn mower, the combination of supporting wheels for the mower, a main driving-shaft and cutting mechanism driven thereby, and an auxiliary cutting mechanism comprising a wheel detachably secured to one of the wheels of the main cutting mechanism, an auxiliary shaft, a coupler whereby said auxiliary shaft is detachably connected to said main driving shaft, and cutting mechanism driven by said auxiliary shaft.

In testimony whereof I hereunto affix my signature.

WIRT L. HAYMOND.

Copies of this patent may be obtained for five cents each, by addressing the "Commissioner of Patents, Washington, D. C."